United States Patent [19]
Pelletier

[11] Patent Number: 5,771,840
[45] Date of Patent: Jun. 30, 1998

[54] APPARATUS FOR RIGHTING ANIMAL CAGES DISCHARGE FROM A WASHING DEVICE

[75] Inventor: Gaetan Pelletier, Beauport, Canada

[73] Assignee: Steris Corporation, Mentor, Ohio

[21] Appl. No.: 788,099

[22] Filed: Jan. 23, 1997

[51] Int. Cl.$^6$ ..................................................... A01K 1/00
[52] U.S. Cl. ......................................... 119/452; 119/458
[58] Field of Search ................................... 119/452, 458, 119/843, 845

[56] References Cited

U.S. PATENT DOCUMENTS

| | | | |
|---|---|---|---|
| 2,840,041 | 6/1958 | Fleming | 119/845 |
| 3,942,476 | 3/1976 | Napier | 119/843 X |

FOREIGN PATENT DOCUMENTS

| | | | |
|---|---|---|---|
| 558736 | 3/1957 | Italy | 119/458 |

OTHER PUBLICATIONS

BASIL—6000 Series Tunnel Cage Washer Marketing Brochure, Mar. 1992.
BASIL—3600 Series Bedding Dispenser Marketing Brochure, Sep. 1991.
NALGENE—Product Cage Marketing Brochure (no date).

*Primary Examiner*—Robert P. Swiatek
*Attorney, Agent, or Firm*—Fay, Sharpe, Beall, Fagan, Minnich & McKee

[57] ABSTRACT

A washer (10) having prewashing, washing, rinsing, and drying stations (12–18) and a first conveyor (20) which transports animal cages (26) through the washer in an open side down orientation. A bedding dispenser (30) has a bedding dispensing station (32) and a second conveyor (40, 48) for transporting the animal cage (26) through the bedding dispensing station (32) in an open side up orientation. A righting device (60, 90, 100) is interposed between the first conveyor (20) and the second conveyor (40, 48). The righting device includes a counter-rotating flip wheel (64, 80, 106) which receives the animal cages from the first conveyor (20), engages a peripheral flange (28) of the cage with a rung (74, 84, 112) of the flip wheel, and pivots the animal cages from the open side down orientation to the open side up orientation on the second conveyor (40, 48).

18 Claims, 5 Drawing Sheets

APPARATUS FOR RIGHTING ANIMAL CAGES DISCHARGE FROM A WASHING DEVICE

BACKGROUND OF THE INVENTION

The present invention relates generally to the material handling arts. It finds particular application in conjunction with animal cage tunnel washers and bedding dispensers and will be described with particular reference thereto. It is to be appreciated, however, that the invention also finds application in conjunction with other types of material handling systems, and the like.

Medical and animal research facilities typically maintain large populations of laboratory animals, such as mice, rats, guinea pigs, etc. The animals are usually housed in cages with up to 4–5 animals per cage. A typical animal cage includes a bottom portion having bedding material placed therein. A removable top portion or cover fits over the bottom portion. The cover may include a filter and vents which cooperate to provide an isolated environment with low humidity and low ammonia build-up within the cage.

Maintaining a sanitary work environment for employees and a clean living environment for the animals requires that the animal cages be cleaned on a regular basis. In particular, each animal cage must be washed, disinfected and re-filled with fresh bedding material. It should be appreciated that, at large facilities, a substantial effort is required to regularly maintain a large number of animal cages.

Devices for washing animal cages are known. Typically, animal cage washing devices include one or more stations such as a pre-wash station, a wash station, a rinse station, a disinfecting station and a drying station. The stations are commonly linked together by a motorized conveyor belt which continuously transports the cage portions through each of the stations. The soiled bedding material within the lower cage portion is typically disposed of prior to being placed upside down on the conveyor belt at the entrance of the washing device. Once the soiled lower cage portion has been transported through each of the stations forming the washing device, a clean, disinfected and dry lower cage portion emerges from the end of the conveyor belt.

Devices for automatically filling animal cages with a metered amount of clean bedding material are also known. Typical bedding filler devices include a conveyor belt which transports an upright lower cage portion through a filling station having a metering device which dispenses a predetermined amount of fresh bedding material from a hopper into the cage lower portion. A properly filled cage lower portion emerges from the filling station ready for research animals to be placed therein.

A bedding filler device is usually located proximate a washing device. As the lower cage portions emerge from the washing device, a worker, typically interposed between the washing device and the bedding filler device, removes the lower cage portions from the conveyor belt, turns the lower cage portions upright, and then places the upright lower cage portions on the conveyor belt associated with the bedding filler device.

It should be appreciated that dedicating employee resources to the task of turning over and positioning clean lower cage portions on a conveyor belt associated with a bedding filler device is not an efficient use of such resources. This is especially true when employees are already necessary for loading the soiled animal cages into the washing device and for receiving the filled lower cage portions that have passed through the filling station of the bedding filler device.

Accordingly, it has been considered desirable to develop a new and improved animal cage righting device which meets the above-stated needs and overcomes the foregoing difficulties and others while providing better and more advantageous results.

SUMMARY OF THE INVENTION

In accordance with one aspect of the present invention, there is provided an object orienting apparatus for use in an object cleaning and filling system. The object cleaning and filling system includes a washing device having a first processing station and a first conveyor which transports an object through the first processing station in a first orientation. The object cleaning and filling system also includes a bedding dispenser having a second processing station and a second conveyor for transporting the object through the second processing station in a second orientation. The object orienting apparatus is interposed between the first conveyor and the second conveyor and includes a rotating flip wheel which receives the object from the first conveyor and which repositions the object from the first orientation to the second orientation before transferring the object to the second conveyor.

In accordance with a second aspect of the present invention, there is provided an animal cage cleaning and filling system including a washing device having a first conveyor which transports an animal cage through a washing station in an open side down orientation. The animal cage cleaning and filling system also includes a bedding dispenser having a second conveyor for transporting the animal cage through a filling station in an open side up orientation to dispense bedding material into the animal cage. A righting device is interposed between the first conveyor and the second conveyor. The righting device receives the animal cage from the first conveyor and pivots the animal cage from the open side down orientation to the open side up orientation before transferring the animal cage to the second conveyor.

One advantage of the present invention is that it permits an animal cage to be transferred from a washing device to a bedding device in a fast, efficient and reliable manner.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components and in various steps and arrangement of steps. The drawings are only for purposes of illustrating a preferred embodiment and are not to be construed as limiting the invention.

DETAILED DESCRIPTION OF THE PREFERRED EMBODIMENTS

Figure 1:
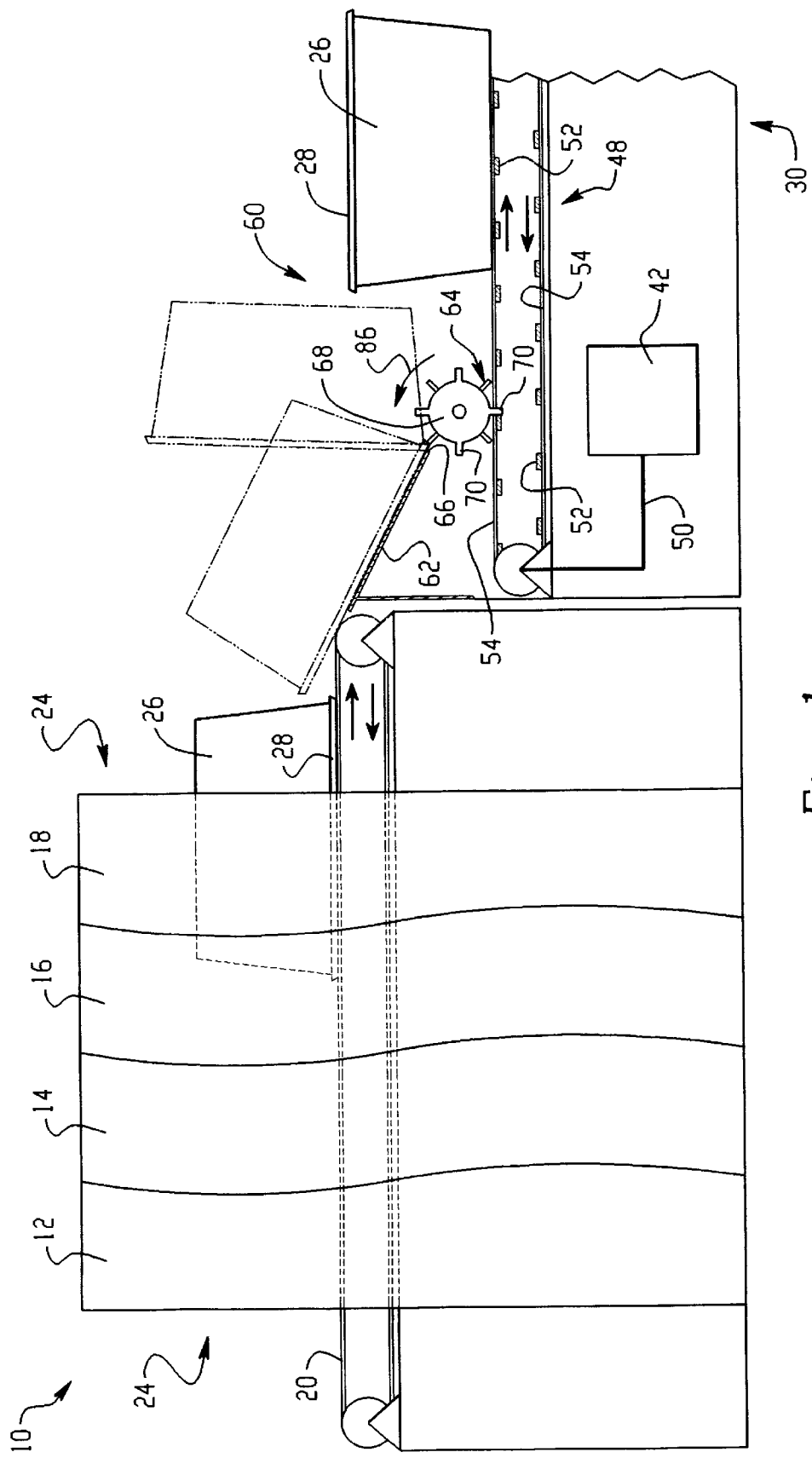
FIG. 1 is a diagrammatic side view of an exemplary washing device positioned adjacent an exemplary bedding dispenser device and a righting device interposed therebetween in accordance with a first embodiment of the invention.

With reference to FIG. 1, an exemplary animal cage washing device 10 has a number of processing stations such as a pre-wash station 12, a wash station 14, a rinse station 16, and a dryer station 18. Additional stations, such as a disinfecting/sanitizing station may replace, or be added to or combined with, one or more of the stations 12–18.

A motorized conveyor belt 20 extends continuously from an entrance 22 of the cage washer 10 through each of the stations 12–18 to an exit 24 of the cage washer 10. The conveyor belt 20 transports items and equipment such as trays or lower cage portions 26 from the entrance 22 through each of the stations 12–18 to the exit 24. The lower cage portions 26 include flanges 28 extending peripherally around the open end edges of the side walls that define the lower cage portions 26.

It should be appreciated that in order for the cage lower portions 26 to properly drain and dry after being washed, the cage lower portions 26 are placed upside down (i.e. an open side down orientation) on the conveyor belt 20. A suitable cage washer 10 is the 6000 Series Tunnel Cage Washer which is commercially available from the Assignee of the present invention.

Figure 2:
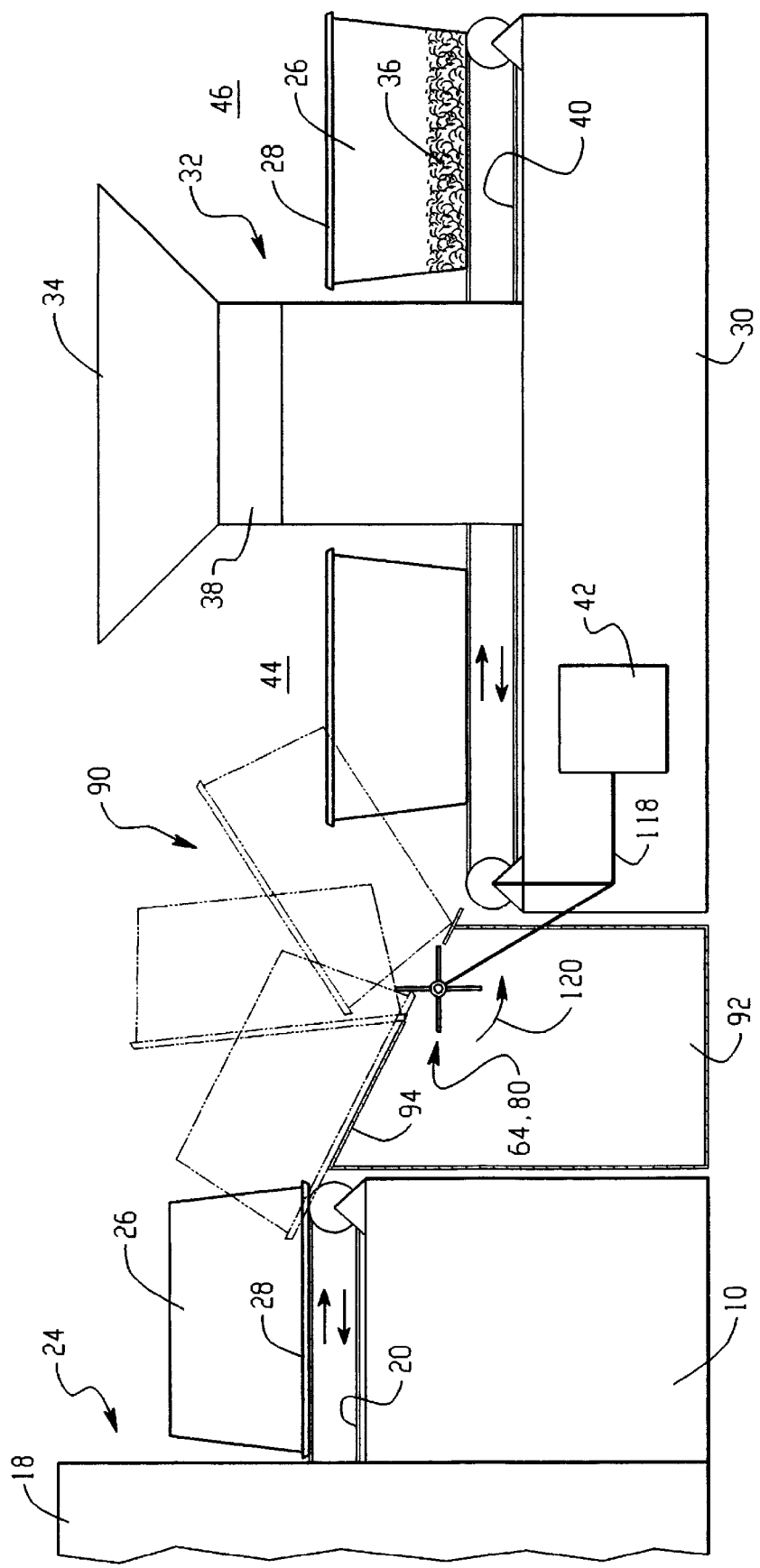
FIG. 2 is a diagrammatic side view of the washing device and bedding dispenser device of FIG. 1, and a righting device interposed therebetween in accordance with a second embodiment of the invention.

A bedding dispenser device 30 is positioned proximate the exit 24 of the cage washer 10. The cage washer 10 and the bedding dispenser 30 cooperate to form an animal cage washing system. As best shown in FIG. 2, the bedding dispenser 30 has a filling station 32 including a hopper 34 for receiving bulk bedding material 36. The filling station 32 also includes a metering unit 38 which regulates the amount of bedding material 36 discharged into the cage lower portions 26 that pass below the metering unit 38.

A conveyor belt 40 driven by a drive 42, such as a motor, extends from an entrance 44 of the bedding dispenser 30 through the filling station 32 to an exit 46 of the bedding dispenser 30. A suitable bedding dispenser 30 is the 3600 Series Bedding Dispenser which is commercially available from the Assignee of the present invention.

Referring again to FIG. 1, an output of the drive 42 is mechanically coupled, linked, or otherwise connected to a conveyor belt 48 via mechanical linkage 50 such as a drive belt, transmission, gears, or the like. The conveyor belt 48 includes a plurality of spaced-apart transverse rungs 52 which are joined to belts, chains, or the like 54, at mutual ends thereof.

A cage righting device 60 is interposed between the washer 10 and the bedding dispenser 30. The cage righting device 60 includes a cage support surface or member 62 angled downwardly from an end edge of the washer exit 24. The righting device 60 also includes a flip wheel 64 which is rotatably supported proximate an end edge 66 of the cage support member 62. At least one drive gear 68 is rotatably secured to at least one end of the flip wheel 64. The drive gear 68 includes a plurality of circumferentially spaced-apart teeth 70 which extend below a plane of the rungs 52 of the conveyor 48 when the teeth 70 are rotated in a substantially downward direction.

Figure 3:
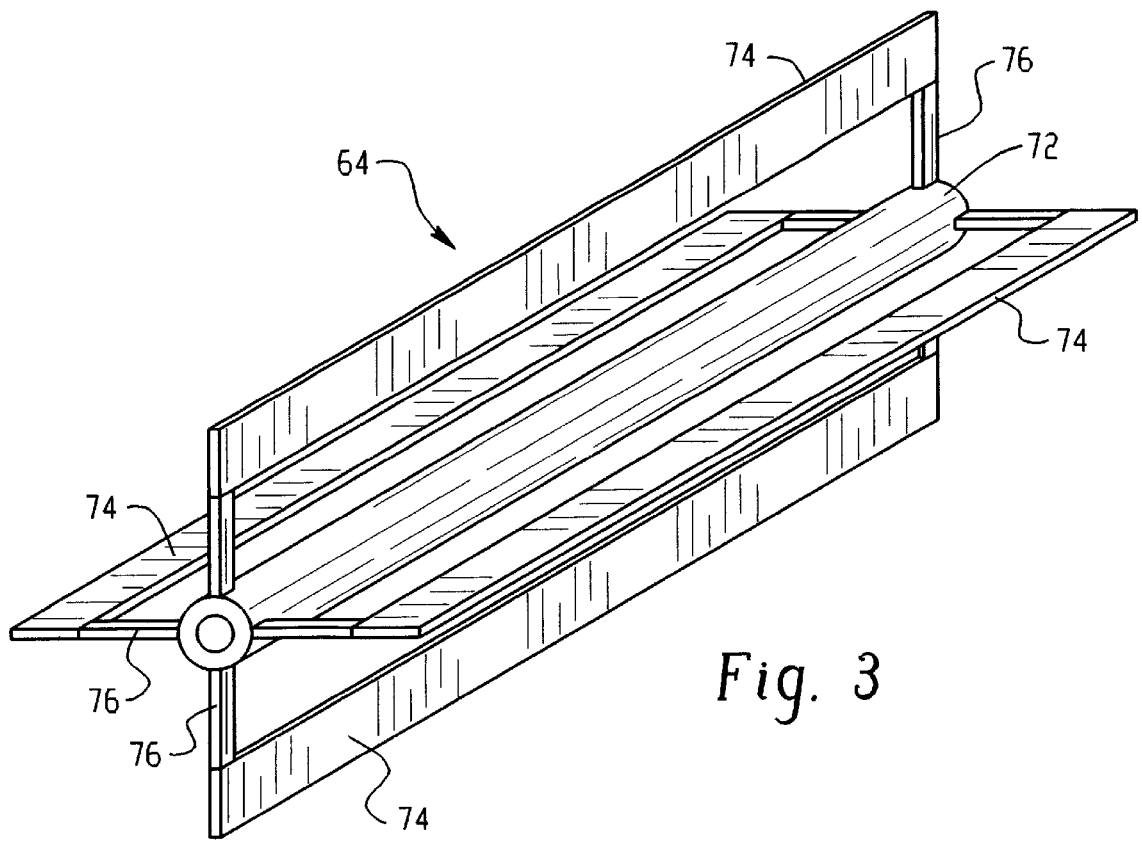
FIG. 3 is a perspective view of a first embodiment of a paddle wheel for the righting devices of FIGS. 1 and 2.

Referring now to FIG. 3, the flip wheel 64 includes a central hub 72 and a plurality of circumferentially spaced-apart rungs 74. The rungs 74 are secured to the hub 62 by radially extending arms 76. For purposes of illustration only, the flip wheel 64 is shown as having four rungs 76.

Figure 4:
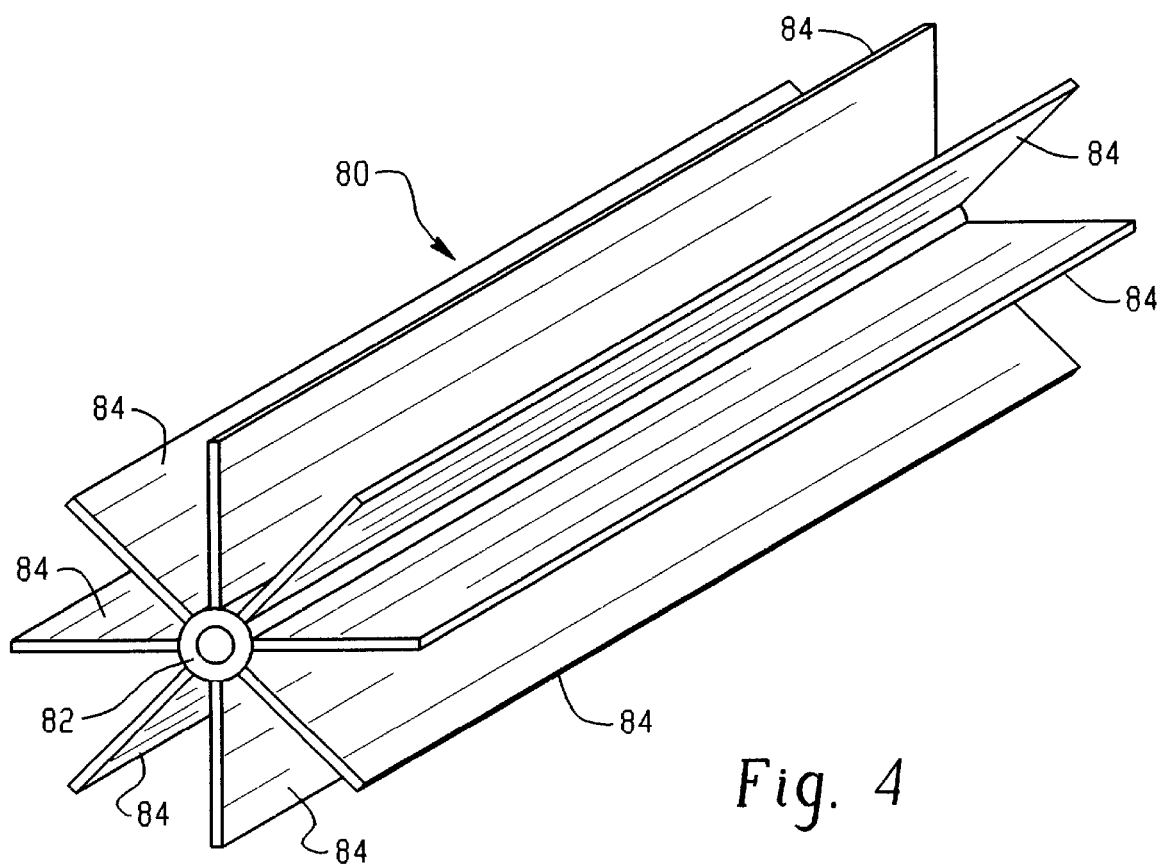
FIG. 4 a perspective view of a second embodiment of a paddle wheel for the righting devices of FIGS. 1 and 2.

Alternatively, as shown in FIG. 4, a flip wheel 80 includes a central hub 82 and a plurality of rungs or paddles 84. The rungs 84 extend radially outwardly directly from the hub 82. For purposes of illustration only, the flip wheel 80 is shown as having eight rungs 84. The rungs 74, 84 may have any shape in cross-section, such as circular, rectangular, square, triangular, etc. In addition, the flip wheels 64, 80 may include any number of rungs 74, 84, and preferably in the range of about 3 to 8 rungs.

In operation, the conveyor belt 48 of the bedding dispenser 30 is rotatably driven in a clockwise direction by the drive 42, as shown in FIG. 1. As the conveyor belt 48 rotates, a rung 52 of the conveyor belt 48 is driven into contact with a substantially downwardly extending tooth 70 of the drive gear 68. The conveyor belt 48 drives the tooth 70 in a direction of travel of the conveyor belt 48, thus rotating the drive gear 68, and hence, the flip wheel 64, in a counter-clockwise direction, as shown by arrow 86.

The cage lower portions 26 are transported by the conveyor belt 20 from the washer exit 24 to the cage support member 62. The inclined surface of the support member 62 permits a leading edge, or more particularly, the flange 28 of a cage lower portion 26 to slide into contact with a rung 74, 84 of the flip wheel 64, 80.

As the flip wheel 64, 80 rotates in a counterclockwise direction, the rung 74, 84 moves downward relative to an outer side surface of the cage lower portion 26 until the rung 74, 84 abuts the flange 28. As the rung 74, 84 continues to rotate, the lower cage portion 26 pivots in a clockwise direction about the end edge 66 of the cage support member 62. The momentum of the pivoting lower cage portion 26 causes the lower cage portion 26 to flip over the flip wheel 64, 80 and land upright (i.e. an open side up orientation) on the conveyor belt 48 of the bedding dispenser 30.

The conveyor belt 48 then transports the upright lower cage portion 26 through the filling station 32 where a predetermined amount of bedding material 36 is dispensed into the lower cage portion 26 by the metering unit 38. The conveyor belt 48 then transports the clean and filled lower cage portion 26 to the exit 46 of the bedding dispenser 30.

Referring again to FIG. 2, the same reference numerals are used to identify common elements previously discussed with regard to the first embodiment of the present invention shown in FIGS. 1, 3 and 4. A cage righting device 90 is interposed between the washer 10 and the bedding dispenser 30. The cage righting device 90 includes a cage support member 92 having a upper surface 94 which angles downward from an end edge of the washer exit 24.

Figure 5:
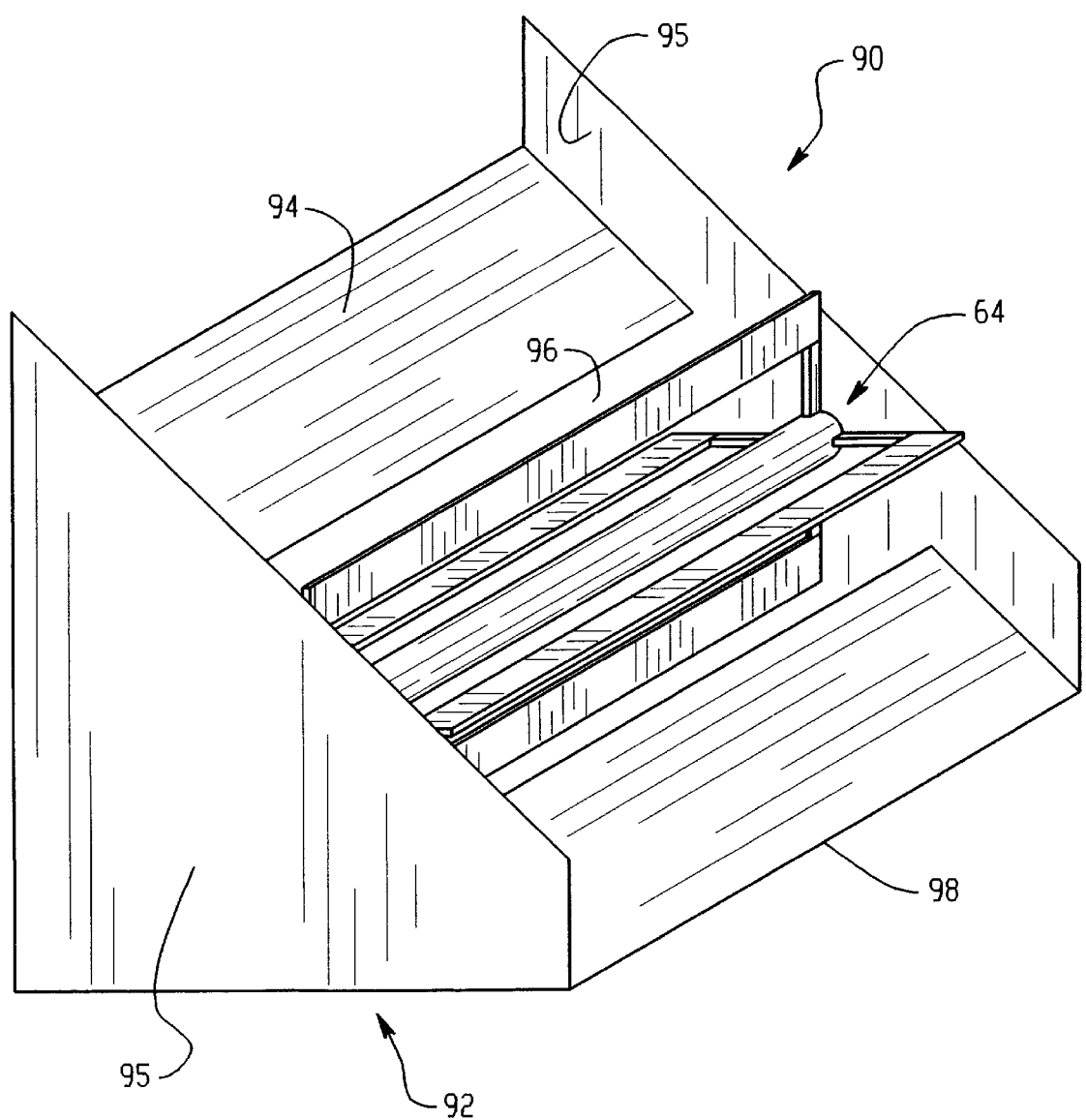
FIG. 5 is a perspective view of the righting device of FIG. 2.

As best seen in FIG. 5, two side walls 95 extend from the upper surface 94 so as to prevent the lower cage portions 26 from sliding off of the upper surface 94 when discharged from the washer exit 24. The righting device 90 also includes a flip wheel, such as the flip wheel 64, which is rotatably supported such that a portion thereof extends through an aperture 96 in the upper surface 94 of the support member 92.

The aperture 96 is positioned intermediate the end edges of the upper surface 94. Alternatively, the flip wheel 64 can be positioned proximate an end edge 98 of the upper surface 94 such that the aperture 96 defines the end edge 98. Although the righting device 90 is shown with flip wheel 64 mounted thereto, any type of flip wheel, such as flip wheel 80 (FIG. 4), may be secured to righting device 90.

Figure 6:
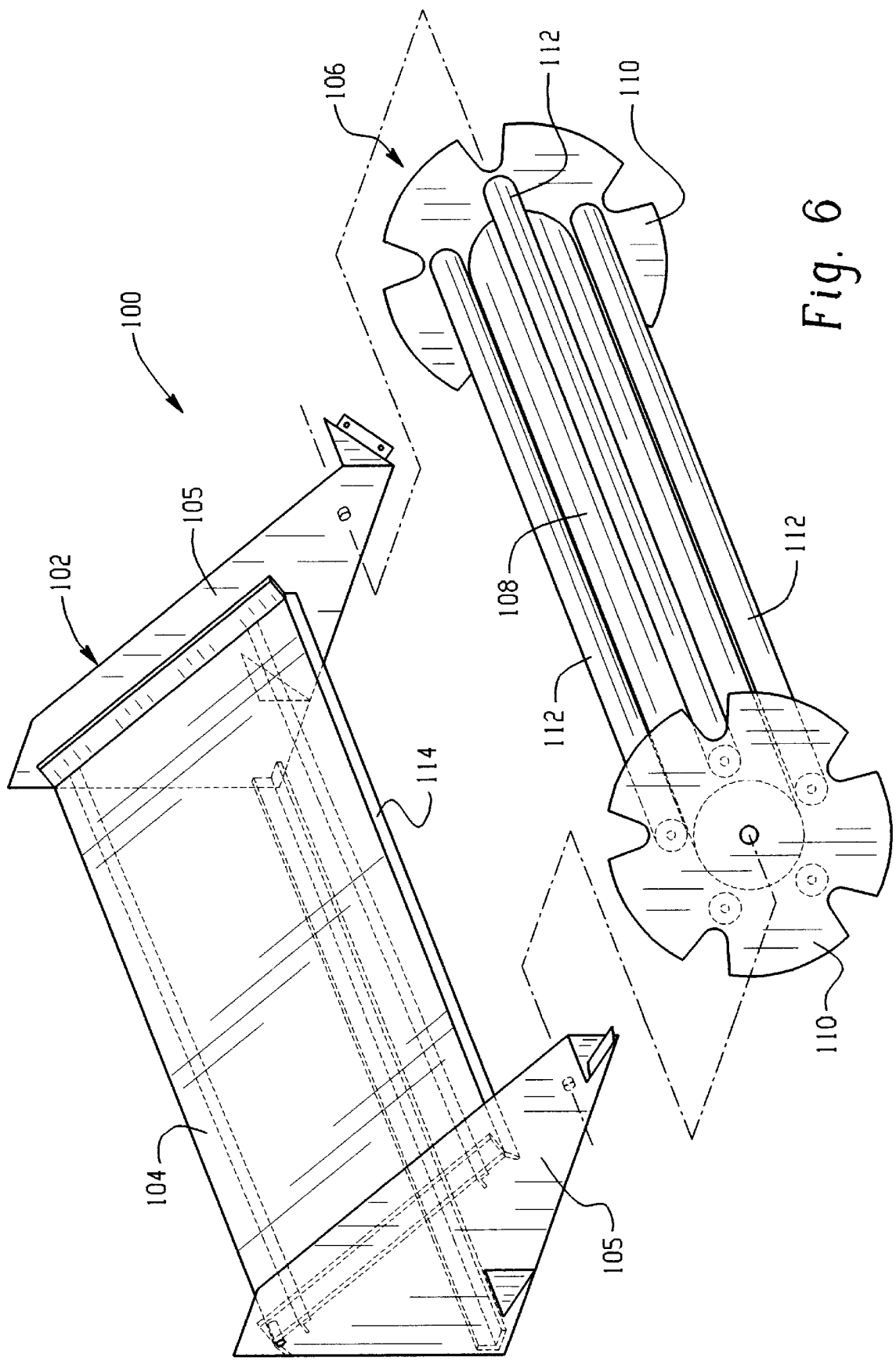
FIG. 6 is a perspective view of a support member and a flip wheel in accordance with a third embodiment of the invention.

Referring now to FIG. 6, an alternative cage righting device 100 may be interposed between the washer 10 and the bedding dispenser 30. The cage righting device 100 includes a cage support member 102 having a upper surface 104 which angles downward from an end edge of the washer exit 24. Two side walls 105 extend from the upper surface 104 so as to prevent the lower cage portions 26 from sliding off of the upper surface 104 when discharged from the washer exit 24.

The righting device 100 also includes a flip wheel, such as a flip wheel 106, which is rotatably supported such that a portion thereof extends above the upper surface 104 of the support member 102. The flip wheel 106 includes a central hub 108 and two drives gears 110 which are rotatably secured to each end of the central hub 108. A plurality of circumferentially spaced-apart rungs 112 are secured between the drive gears 110. For purposes of illustration only, the flip wheel 106 is shown as having five rungs 112.

The flip wheel 106 is positioned proximate an end edge 114 of the upper surface 104. Although the righting device 100 is shown with flip wheel 106 mounted thereto, any type of flip wheel, such as flip wheel 64 (FIG. 3) or flip wheel 80 (FIG. 4), may be secured to righting device 100.

Referring again to FIG. 2, an output of the drive means 42 is coupled, linked, or otherwise connected to the conveyor belt 40 of the bedding dispenser 30 and to the flip wheel 64, 80 or to one or both of the drive gears 110 via mechanical linkage 118 such as drive belts, transmission, gears, or the like. Alternatively, the righting device 106 may be positioned so that the drive gears 110 extend below a plane of the conveyor 40 for rotation by the conveyer 40 as shown in FIG. 1.

In operation, the drive means 42 rotatably drives the conveyor belt 40 of the bedding dispenser 30 in a clockwise direction via the linkage 118. The drive means 42 also drives or otherwise causes the flip wheel 64, 80, 100 to rotate in a counter-clockwise direction via the linkage 118.

The cage lower portions 26 are transported by the conveyor belt 20 from the washer exit 24 to the cage support member 92, 102. The inclined upper surface 94, 104 of the support member 92 permits a leading edge, or more particularly, the flange 28 of a cage lower portion 26 to slide into contact with a rung 74, 84, 112 of the flip wheel 64, 80, 106.

As the flip wheel 64, 80, 106 rotates in a counter-clockwise direction as shown by the arrow 120, the rung 74, 84, 112 moves downward relative to the outer side surface of the cage lower portion 26 until the rung 74, 84, 112 abuts the flange 28. As the rung 74, 84, 112 continues to rotate, the lower cage portion 26 pivots in a clockwise direction about an intermediate edge of the upper surface, such as edge 114 of the upper surface 104.

The momentum of the pivoting lower cage portion 26 causes the lower cage portion 26 to flip over the flip wheel 64, 80, 106 and land upright on the rotating conveyor belt 40 of the bedding dispenser 30.

The conveyor belt 40 then transports the upright lower cage portion 26 through the filling station 32 where a predetermined amount of bedding material 36 is dispensed into the lower cage portion 26 by the metering unit 38. The conveyor belt 40 then transports the clean and filled lower cage portion 26 to the exit 46 of the bedding dispenser 30.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed:

1. An object orienting apparatus for use in an object cleaning and filling system including a washing device having a first processing station and a first conveyor which transports an object through the first processing station in a first orientation, an d further including a bedding dispenser having a second processing station and a second conveyor for transporting the object through the second processing station in a second orientation, the object orienting apparatus interposed between the first conveyor and the second conveyor, the apparatus including:
   a rotating flip wheel which receives the object from the first conveyor and which repositions said object from the first orientation to the second orientation before transferring the object to the second conveyor.

2. The apparatus of claim 1, wherein the object includes a flange extending around a periphery thereof, the object being driven from said first orientation to said second orientation when said flip wheel contacts said flange.

3. The apparatus of claim 1, wherein said flip wheel includes a rung, the object being driven from said first orientation to said second orientation when said rung contacts said object.

4. The apparatus of claim 3, wherein the object includes a flange extending around a periphery thereof, the object being driven from said first orientation to said second orientation when said rung contacts said flange.

5. The apparatus of claim 1, wherein said apparatus further includes a drive gear rotatably coupled to said flip wheel, said drive gear having a plurality of teeth which cooperate with the second conveyor to rotate said flip wheel.

6. The apparatus of claim 1, further including drive means coupled to the second conveyor and to said flip wheel for rotatably driving the second conveyor and said flip wheel.

7. The apparatus of claim 1, wherein said apparatus repositions said object from an upside down orientation to an upright orientation.

8. The apparatus of claim 1, wherein said object is an animal cage lower portion.

9. The apparatus of claim 1, wherein said object is a tray.

10. An animal cage cleaning and filling system comprising:
    a washing device having a first conveyor which transports an animal cage through a washing station in an open side down orientation;
    a bedding dispenser having a second conveyor for transporting said animal cage through a filling station in an open side up orientation to dispense bedding material into said animal cage; and
    a righting device interposed between said first conveyor and said second conveyor, said righting device receiving said animal cage from said first conveyor and pivoting said animal cage from said open side down orientation to said open side up orientation before transferring said animal cage to said second conveyor.

11. The animal cage cleaning and filling system of claim 10, wherein said righting device includes an upper surface and a flip wheel having at least a portion thereof projecting above said upper surface.

12. The animal cage cleaning and filling system of claim 11, wherein said righting device further includes a drive gear rotatably coupled to said flip wheel, said drive gear having a plurality of teeth which cooperate with said second conveyor to rotate said flip wheel.

13. The animal cage cleaning and filling system of claim 11, further including a drive coupled to said second conveyor and to said flip wheel for rotatably driving said second conveyor and said flip wheel.

14. The animal cage cleaning and filling system of claim 11, wherein said upper surface is inclined relative to said first and said second conveyors.

15. The animal cage cleaning and filling system of claim 11, wherein said flip wheel includes a plurality of rungs, said animal cage being driven from said open side down orientation to said open side up orientation when one of said rungs contacts said animal cage.

16. The animal cage cleaning and filling system of claim 15, wherein said animal cage includes a flange extending around a periphery thereof, said animal cage being driven from said open side down orientation to said open side up orientation when one of said rungs contacts said flange.

17. The animal cage cleaning and filling system of claim 10, wherein said animal cage includes a flange extending around a periphery thereof, said animal cage being driven from said open side down orientation to said open side up orientation by a counter-rotating flip wheel contacting said flange.

18. A method of cleaning and filling an animal cage comprising the steps of:

transporting the animal cage through a wash station in an open side down orientation;

transporting the animal cage through a filling station in an open side up orientation;

rotating a flip wheel into abutment with a leading edge of the animal cage to invert the animal cage from the open side down orientation to the open side up orientation before transporting the animal cage to the filling station.

* * * * *